US011390714B2

(12) United States Patent
Lee et al.

(10) Patent No.: US 11,390,714 B2
(45) Date of Patent: Jul. 19, 2022

(54) POLYARYLENE SULFIDE RESIN AND PREPARATION METHOD THEREOF

(71) Applicant: SK CHEMICALS CO., LTD., Gyeonggi-do (KR)

(72) Inventors: Se-Ho Lee, Gyeonggi-do (KR); Sung-Gi Kim, Gyeonggi-do (KR)

(73) Assignee: HDC POLYALL CO., LTD., Ulsan (KR)

( * ) Notice: Subject to any disclaimer, the term of this patent is extended or adjusted under 35 U.S.C. 154(b) by 0 days.

(21) Appl. No.: 17/030,112

(22) Filed: Sep. 23, 2020

(65) Prior Publication Data

US 2021/0002428 A1  Jan. 7, 2021

Related U.S. Application Data

(62) Division of application No. 15/777,966, filed as application No. PCT/KR2016/013487 on Nov. 22, 2016, now Pat. No. 10,822,457.

(30) Foreign Application Priority Data

Nov. 23, 2015 (KR) ........................ 10-2015-0164287

(51) Int. Cl.
C08G 75/0263 (2016.01)
C08J 5/18 (2006.01)
C08G 75/0204 (2016.01)
C08J 5/00 (2006.01)
C08G 75/0231 (2016.01)

(52) U.S. Cl.
CPC ..... C08G 75/0263 (2013.01); C08G 75/0204 (2013.01); C08G 75/0231 (2013.01); C08J 5/00 (2013.01); C08J 5/18 (2013.01); C08J 2381/02 (2013.01)

(58) Field of Classification Search
CPC ............. C08G 75/14; C08G 75/0263; C08G 75/0268; C08G 75/025
USPC .................... 528/381, 389, 373, 388
See application file for complete search history.

(56) References Cited

U.S. PATENT DOCUMENTS

| | | | |
|---|---|---|---|
| 4,786,713 A | 11/1988 | Rule et al. | |
| 4,868,275 A | 9/1989 | Kato et al. | |
| 6,001,934 A | 12/1999 | Yamanaka et al. | |
| 2006/0270793 A1 | 11/2006 | Tokushige et al. | |
| 2011/0257363 A1 | 10/2011 | Shin et al. | |
| 2011/0269935 A1 | 11/2011 | Shin et al. | |
| 2012/0322971 A1 | 12/2012 | Kim et al. | |
| 2013/0273280 A1 | 10/2013 | Luo et al. | |
| 2013/0273799 A1 | 10/2013 | Luo et al. | |
| 2014/0350215 A1 | 11/2014 | Shin et al. | |
| 2015/0126668 A1 | 5/2015 | Kanomata et al. | |
| 2015/0141550 A1 | 5/2015 | Kang et al. | |
| 2015/0015227 A1 | 6/2015 | Kim et al. | |
| 2015/0218376 A1 | 8/2015 | Lee et al. | |
| 2015/0353687 A1 | 12/2015 | Shin et al. | |
| 2016/0340473 A1 | 11/2016 | Lee et al. | |
| 2016/0376439 A1 | 12/2016 | Tomoda | |
| 2018/0215918 A1 | 8/2018 | Tomoda | |
| 2018/0334542 A1 | 11/2018 | Lee et al. | |
| 2018/0346721 A1 | 12/2018 | Lee et al. | |
| 2019/0062505 A1 | 2/2019 | Lee et al. | |

FOREIGN PATENT DOCUMENTS

| | | |
|---|---|---|
| CN | 102325826 | 1/2012 |
| CN | 102341434 | 2/2012 |
| CN | 102762638 | 10/2012 |
| CN | 102791773 | 11/2012 |
| CN | 104254574 | 12/2014 |
| CN | 104364316 | 2/2015 |
| CN | 104520352 | 4/2015 |
| CN | 104640929 | 5/2015 |
| CN | 104861163 | 8/2015 |
| EP | 2380921 | 10/2011 |
| EP | 2546279 | 1/2013 |
| EP | 2883900 | 6/2015 |
| EP | 3381968 | 10/2018 |
| JP | H06-100692 | 4/1994 |
| JP | H09-228145 | 9/1997 |
| JP | 2015-528525 | 9/2015 |
| JP | WO 2015/020142 | 3/2017 |
| JP | WO 2015/030136 | 3/2017 |
| JP | WO 2015/045724 | 3/2017 |
| JP | WO 2015/049941 | 3/2017 |
| KR | 10-1999-0029467 | 4/1999 |
| KR | 10-2006-0074919 | 7/2006 |
| KR | 10-2013-0138538 | 12/2013 |

(Continued)

OTHER PUBLICATIONS

International Search Report prepared by the Korean Intellectual Property Office dated Mar. 3, 2017, for International Application No. PCT/KR2016/013487.
Extended Search Report for European Patent Application No. 16868854.7, dated Jun. 24, 2019, 9 pages.
Official Action for U.S. Appl. No. 15/777,966, dated Jul. 3, 2019 5 pages Restriction Requirement.
Official Action for U.S. Appl. No. 15/777,966, dated Oct. 22, 2019 7 pages.
Notice of Allowance for U.S. Appl. No. 15/777,966, dated Mar. 2, 2020 8 pages.

(Continued)

*Primary Examiner* — Shane Fang
(74) *Attorney, Agent, or Firm* — Locke Lord LLP; Scott D. Wofsy; Gabrielle Gelozin

(57) ABSTRACT

The present invention relates to a polyarylene sulfide which has more improved compatibility with other polymer materials or fillers, and a method for preparing the same. The polyarylene sulfide is characterized in that at least part of end groups of the main chain of the polyarylene sulfide is hydroxyl group (—OH), the polyarylene sulfide contains iodine bonded to its main chain and free iodine, and the content of iodine bonded to the main chain and free iodine is 10 to 10,000 ppmw.

11 Claims, No Drawings

(56) References Cited

FOREIGN PATENT DOCUMENTS

| KR | 10-2014-0037776 | 3/2014 |
|----|-----------------|--------|
| KR | 10-2015-0003163 | 1/2015 |
| KR | 10-2015-0085087 | 7/2015 |
| KR | 10-2015-0093641 | 8/2015 |
| TW | 201418365 | 5/2014 |
| TW | 201533161 | 9/2015 |
| WO | WO 2015/030138 | 3/2015 |
| WO | WO 2015/033855 | 3/2015 |

OTHER PUBLICATIONS

Notice of Allowance for U.S. Appl. No. 15/777,966, dated Jul. 1, 2020 8 pages.

POLYARYLENE SULFIDE RESIN AND PREPARATION METHOD THEREOF

CROSS REFERENCE TO RELATED APPLICATIONS

This application is a divisional application of U.S. application Ser. No. 15/777,966, filed on May 22, 2018 entitled "POLYARYLENE SULFIDE RESIN AND PREPARATION METHOD THEREOF," which is a national stage application under 35 U.S.C. 371 and claims the benefit of PCT Application No. PCT/KR2016/013487 having an international filing date of 22 Nov. 2016, which designated the United States, which PCT application claimed the benefit of South Korea Application No. 10-2015-0164287 filed 23 Nov. 2015, the disclosure of each of which are incorporated herein by reference.

TECHNICAL FIELD

The present invention relates to a polyarylene sulfide which has more improved compatibility with other polymer materials or fillers, and a method for preparing the same.

BACKGROUND

Now, polyarylene sulfide is a typical engineering plastic, and the demand for various products being used in a high temperature and corrosive environment or the electronic products is increasing due to its high heat resistance and chemical resistance, flame resistance, electric insulation, and so on.

Among the polyarylene sulfides, polyphenylene sulfide is the only one that is commercially available (hereinafter, referred to as "PPS"). The commercial preparation process of PPS being applicable until now involves a solution polymerization of p-dichlorobenzene (pDCB) and sodium sulfide in a polar organic solvent such as N-methylpyrrolidone. This process is known as Macallum process.

However, in the case of the polyarylene sulfide prepared by such Macallum process, a salt type by-product may be generated in a solution polymerization process using sodium sulfide or the like, and thus there is a disadvantage that washing or drying process is required for eliminating a salt type by-product or a residual organic solvent. Furthermore, since the polyarylene sulfide prepared by the Macallum process has a powder form, the post processing is not easy and the workability may decrease.

Accordingly, a method of melt-polymerizing reactants including a diiodoaromatic compound and an elemental sulfur has been suggested as the method of preparing the polyarylene sulfide such as PPS. The polyarylene sulfide thus prepared does not generate a salt type by-product and also does not require the use of an organic solvent during the preparation process, and thus a separate process for eliminating thereof is not required. Furthermore, since the polyarylene sulfide prepared finally has a pellet form, there is an advantage that the post processing is easy and the workability is good.

However, in the case of the polyarylene sulfide prepared by the melt-polymerization method, the ends of the main chain are composed of iodine and most aryl groups (typically, benzene). Therefore, there is a disadvantage that such polyarylene sulfide is inferior in the compatibility with other polymer materials or all sorts of reinforcements or fillers such as glass fibers due to the characteristics of its main chain structure.

Consequently, in the case of the polyarylene sulfide prepared by the melt-polymerization method, it was difficult to compound with other polymer materials or fillers in order to exhibit optimized physical properties which are suitable for different applications, and it was difficult to exhibit necessary optimized physical properties even after compounding.

DETAILS OF THE INVENTION

Objects of the Invention

It is an aspect of the present invention to provide a polyarylene sulfide which has more improved compatibility with other polymer materials or fillers, and a method for preparing the same.

It is another aspect of the present invention to provide a molded article including the polyarylene sulfide.

Technical Means

The present invention provides a polyarylene sulfide in which at least part of end groups of the main chain of the polyarylene sulfide is hydroxyl group (—OH), wherein the polyarylene sulfide contains iodine bonded to its main chain and free iodine, and the content of iodine bonded to its main chain and free iodine is 10 to 10,000 ppmw.

Also, the present invention provides a method for preparing polyarylene sulfide, including the steps of: polymerizing reactants including a diiodoaromatic compound and an elemental sulfur; and adding an aromatic compound having hydroxy group thereto while carrying out the polymerization step.

In addition, the present invention provides a molded article including the polyarylene sulfide.

Hereinafter, the polyarylene sulfide, the preparation method thereof and the molded article including the same according to specific embodiments of the invention will be described in more detail. However, the embodiments are provided only for an example of the invention, and the scope of the invention is not limited to or by them, and it will be obvious to those skilled in the art that various modifications and variation can be made to the invention without departing from the scope of the invention.

Throughout this specification, unless the context clearly mentions otherwise, the term "include" or "comprise" means to include any components (or ingredients), and it cannot be interpreted as a meaning of excluding the addition of other components (or ingredients).

According to one embodiment of the invention, there is provided a polyarylene sulfide in which at least part of end groups of the main chain of the polyarylene sulfide is hydroxyl group (—OH), wherein the polyarylene sulfide contains iodine bonded to its main chain and free iodine, and the content of iodine bonded to the main chain and free iodine is 10 to 10,000 ppmw.

The present inventors have found that, in the process of preparing a polyarylene sulfide by melt-polymerizing reactants including a diiodoaromatic compound and an elemental sulfur, it is possible to obtain a polyarylene sulfide which can exhibit better compatibility with other polymer materials or fillers, thereby being compounded with various materials and realizing optimized physical properties suitable for various uses through the compounding. The present invention has been completed on the basis of such finding.

From the research of the present inventors, it was confirmed that, since the polyarylene sulfide prepared by a conventional melt-polymerization method has the ends of the main chain composed of iodine and most aryl groups (typically, benzene), there is substantially no reactive group in the main chain, and thus there is a disadvantage of that such polyarylene sulfide is inferior in the compatibility with other polymer materials, all sorts of reinforcements such or fillers such as glass fiber.

In the meantime, it has been found that the polyarylene sulfide of one embodiment exhibits excellent compatibility with other polymer materials or fillers, since a reactive group such as hydroxy group (—OH) is introduced to at least part of the ends of the main chain of the same. For example, the polyarylene sulfide of one embodiment can exhibit excellent compatibility with polymer materials such as a nylon resin, a polyethylene glycol resin (PEG), a polyethylene oxide resin, a polyethyleneimine resin, a polyvinyl alcohol resin, having a hydrophilic group in a polymer chain, or an ethylene glycidyl methacrylate elastomer having reactivity with a hydroxyl group; or an inorganic material having a hydrophilic group such as glass fiber or talc. It is predicted that this is due to the formation of strong polar or hydrogen bonds between a hydrophilic group or a polar group possessed by the polymer material or the inorganic material, and a hydroxyl group at the end of the polyarylene sulfide. For example, a hydroxyl group in the silanol group of the glass fiber and a hydroxyl group bonded to the end of the main chain of the polyarylene sulfide meet to form a strong hydrogen bond. Alternatively, while an epoxy ring of a polymer material having epoxy functional group such as a glycidyl group (for example, ethylene glycidyl methacrylate elastomer, etc.) is opened, it can be combined with a hydroxy group bonded to the end of the main chain of the polyarylene sulfide, thereby exhibiting a strong binding force. Consequently, the polyarylene sulfide of one embodiment can be suitably compounded with various polymer materials or fillers, and makes it possible to provide a resin composition and a molded article showing optimized properties suitable for various uses.

In addition, as the polyarylene sulfide is obtained by melt-polymerizing reactants including a diiodoaromatic compound and an elemental sulfur, it includes iodine bonded to the main chain thereof and free iodine, and the content of iodine bonded to the main chain and free iodine can be about 10 to 10,000 ppmw, or about 10 to 3000 ppmw, or about 50 to 2000 ppmw. The content of iodine bonded to the main chain and free iodine can be measured by a method in which a polyarylene sulfide sample is heat-treated at a high temperature and then quantified by using ion chromatography, as in the examples described below. In this case, the free iodine may refer collectively to an iodine molecule, an iodide ion, or an iodine radical that is generated in the process of polymerization of the diiodoaromatic compound and the elemental sulfur and remains together in a state of being chemically separated from the finally formed polyarylene sulfide.

Consequently, such polyarylene sulfide solves the problems of the polyarylene sulfide produced by the conventional McCallum process, and it can maintain the advantages of the polyarylene sulfide obtained by the melt-polymerization, for example, advantages such as easy post-processing and excellent mechanical properties without generating by-products. In addition, the polyarylene sulfide can exhibit excellent heat resistance, chemical resistance and mechanical properties unique to the polyarylene sulfide.

The polyarylene sulfide of one embodiment may show a peak in the range of about 3300 to 3600 cm$^{-1}$ derived from hydroxy groups of the ends of the main chain in a FT-IR spectrum, when analyzed with FT-IR spectroscopy. At this time, the intensity of the peak in the range of about 3300 to 3600 cm$^{-1}$ may correspond to the amount of hydroxy groups bonded to the end group of the main chain.

According to one example, in the FT-IR spectrum of the polyarylene sulfide of one embodiment described above, if the height of the ring stretch peak shown in the range of about 1400 to 1600 cm$^{-1}$ is assumed as the intensity of 100%, the relative height intensity of the peak in the range of about 3300 to 3600 cm$^{-1}$ may be about 0.0001 to 10%, or about 0.005 to 7%, or about 0.001 to 4%, or about 0.01 to 3%. At this time, the ring stretch peak shown in the range of 1400 to 1600 cm$^{-1}$ may be derived from the arylene group such as phenylene included in the main chain of the polyarylene sulfide. Since the height intensity of the peak in the range of 3300 to 3600 cm$^{-1}$ derived from hydroxy groups is about 0.0001 to 10%, or about 0.005 to 7%, or about 0.001 to 4%, or about 0.01 to 3% relative to the height intensity of the peak derived from the arylene group (for example, phenylene group), the polyarylene sulfide can maintain excellent physical properties unique to the polyarylene sulfide while exhibiting excellent compatibility with other polymer materials or fillers, for example, polymer materials or fillers having hydrophilic groups.

Meanwhile, the polyarylene sulfide of one embodiment may have a melting point of about 265 to 290° C., or about 270 to 285° C., or about 275 to 283° C. Because of such melting point range, the polyarylene sulfide of one embodiment having an introduced hydroxyl group obtained by melt-polymerization method can exhibit excellent heat resistance and flame retardance.

Also, the polyarylene sulfide may have a number average molecular weight of about 5,000 to 50,000, or about 8,000 to 40,000, or about 10,000 to 30,000. And, the polydispersity index defined as the weight average molecular weight divided by the number average molecular weight may be about 2.0 to 4.5, or about 2.0 to 4.0, or about 2.0 to 3.5. Because the polyarylene sulfide of one embodiment has the above-mentioned polydispersity index and molecular weight range, it can exhibit excellent mechanical properties and processability and can be processed into various molded articles which can be applied to various uses.

Furthermore, the polyarylene sulfide of one embodiment mentioned above may have a melt viscosity of about 10 to 50,000 poise, or about 100 to 20,000, or about 300 to 10,000, which is measured with a rotating disc viscometer at 300° C. The polyarylene sulfide of one embodiment having such melt viscosity can exhibit both superior mechanical properties and excellent processability.

For example, the polyarylene sulfide of one embodiment may have a tensile strength of about 100 to 900 kgf/cm$^2$, or about 200 to 800 kgf/cm$^2$, or about 300 to 700 kgf/cm$^2$, which is measured according to ASTM D 638, and an elongation of about 1 to 10%, or about 1 to 8%, or about 1 to 6%, which is measured according to ASTM D 638. Furthermore, the polyarylene sulfide may have a flexural strength of about 100 to 2,000 kgf/cm$^2$, or about 500 to 2,000 kgf/cm$^2$, or about 1,000 to 2,000 kgf/cm$^2$, which is measured according to ASTM D 790, and an impact strength of about 1 to 100 J/m, or about 5 to 50 J/m, or about 10 to 20 J/m, which is measured according to ASTM D 256. Like this, the polyarylene sulfide of one embodiment can exhibit various physical properties such as excellent mechanical properties, while exhibiting excellent compatibility with other polymer materials or fillers.

The polyarylene sulfide of one embodiment exhibits excellent compatibility with various thermoplastic resins, for example, polyvinyl alcohol-based resins such as polyvinyl alcohol resin, polyether-based resins such as polyethylene glycol resin or polyethylene oxide resin, polyalkylene imine-based resins such as polyethylene imine resin, polyvinyl chloride-based resins, polyamide-based resins such as nylon resin, polyolefin-based resins or polyester-based resins; or various thermoplastic elastomers, for example, polyvinyl chloride-based elastomers, poly(meth)acrylate-based elastomers such as ethylene glycidyl methacrylate elastomer, polyolefin-based elastomers, polyurethane-based elastomers, polyester-based elastomers, polyimide-based elastomers, or polybutadiene-based elastomers; or various reinforcements/fillers such as a glass fiber, a carbon fiber, a boron fiber, a glass bead, a glass flake, a talc, a calcium carbonate and the like In a more specific example, the polyarylene sulfide of one embodiment can exhibit excellent compatibility with polymer materials such as a nylon resin, a polyethylene glycol resin, a polyethylene oxide resin, a polyethyleneimine resin, a polyvinyl alcohol resin, having a hydrophilic group in a polymer chain, or an ethylene glycidyl methacrylate elastomer having reactivity with a hydroxyl group; or an inorganic material having a hydrophilic group such as glass fiber or talc. As described above, this seems to be due to the formation of strong polar or hydrogen bonds between the hydrophilic group or a polar group possessed by the polymer material or the inorganic material, and a hydroxyl group at the end of the polyarylene sulfide. Therefore, the polyarylene sulfide of one embodiment can be compounded with these various polymer materials or fillers to show excellent synergistic effect, and it becomes possible to achieve optimized properties suitable for various uses.

In one example, it was confirmed that, by compounding about 90 wt. % of the polyarylene sulfide of one embodiment in which hydroxy group is introduce to the end of the main chain with about 10 wt. % of elastomer, the elongation was greatly elevated from about 1.5% to about 18.0%. It was also confirmed that, by compounding about 60 wt. % of the polyarylene sulfide with about 40 wt. % of glass fiber, the impact strength was greatly elevated from about 18 J/m to about 92 J/m. It was confirmed from the improvement in physical properties due to such compounding that the polyarylene sulfides of one embodiment can exhibit excellent compatibility with other various polymer materials or fillers, and consequently can exhibit excellent synergistic effects.

However, when the polyarylene sulfide of one embodiment is compounded with other polymer materials or fillers, it is preferable to mix about 10 to 99 wt. % or about 50 to 90 wt. % of the polyarylene sulfide and about 1 to 90 wt. % or about 10 to 50 wt. % of one or more components selected from the group consisting of a thermoplastic resin, a thermoplastic elastomer, and a filler in order to maintain the physical properties unique to the polyarylene sulfide. A molded article having excellent physical properties preferable to various uses can be prepared by molding such mixture with a method such as biaxial extrusion.

Meanwhile, according to another embodiment of the invention, a method for preparing the polyarylene sulfide is provided. Such preparation method of another embodiment may include the steps of polymerizing reactants including a diiodoaromatic compound and an elemental sulfur; and adding an aromatic compound having hydroxy group thereto while carrying out the polymerization step.

In the preparation method of another embodiment, the aromatic compound having hydroxyl group may be added thereto when the polymerization reaction between the diiodoaromatic compound and the elemental sulfur is progressed about 90% or more, or about 90% or more and less than 100%, (for example, in the latter part of the polymerization reaction), wherein the degree of progress of the polymerization reaction is determined by the ratio of present viscosity to target viscosity. The degree of polymerization reaction can be determined as the ratio of present viscosity to target viscosity. For this, an objective molecular weight of the polyarylene sulfide to be obtained and a target viscosity of the polymerization product corresponding to the objective molecular weight are set up, and the present viscosity according to the degree of progress of the polymerization reaction is measured. At this time, the method of measuring the present viscosity may be determined by a method well-known to those skilled in the art depending on the scale of reactor. For example, when the polymerization is carried out in a relatively small polymerization reactor, it may be measured by using a viscometer after taking a sample from the reactor where the polymerization reaction is progressing. In the alternative, when the reaction is carried out in a huge continuous polymerization reactor, the present viscosity can be automatically measured continuously in real time with a viscometer installed in the reactor itself.

Like this, in the process of the polymerization reaction of the reactants including the diiodoaromatic compound and elemental sulfur, the polyarylene sulfide of one embodiment in which hydroxy group is introduced to at least part of end groups of the main chain can be prepared by adding and reacting the aromatic compound having hydroxyl group in the latter part of the polymerization reaction. Particularly, since the compound having hydroxy group is added in the latter part of the polymerization reaction, proper amount of hydroxyl group can be introduced to the end groups of the main chain, and the polyarylene sulfide of one embodiment having excellent physical properties unique to the polyarylene sulfide while exhibiting excellent compatibility with other polymer materials or fillers can be prepared effectively.

Meanwhile, in the preparation method of another embodiment, a compound in the form of an arbitrary monomer (monomolecule) having hydroxy group may be used as the aromatic compound having hydroxy group. More specific examples of the aromatic compound having hydroxy group include 2-iodophenol, 3-iodophenol, 4-iodophenol, 2,2'-dithiodiphenol, 3,3'-dithiodiphenol, 4,4'-dithiodiphenol, and the like. In addition, various aromatic compounds having hydroxyl group can be used.

Furthermore, the aromatic compound having hydroxy group may be added thereto in the amount of about 0.0001 to 10 parts by weight, or about 0.001 to 7 parts by weight, or about 0.01 to 2 parts by weight, based on 100 parts by weight of the diiodoaromatic compound. Proper amount of hydroxyl group can be introduced to the end groups of the main chain by adding such amount of the aromatic compound having hydroxy group, and consequently, the polyarylene sulfide of one embodiment having excellent properties unique to the polyarylene sulfide while exhibiting excellent compatibility with other polymer materials or fillers can be prepared effectively.

Meanwhile, in the preparation method of another embodiment, the polyarylene sulfide is prepared basically by the method of polymerizing the reactants including the diiodoaromatic compound and elemental sulfur, whereby the polyarylene sulfide having excellent mechanical properties and the like compared with a conventional McCallum process can be prepared. Such polyarylene sulfide includes iodine bonded to the main chain and free iodine as already described above, and the content of iodine bonded to the main chain and free iodine may be about 10 to 10,000 ppmw. The content of iodine bonded to the main chain and free iodine can be measured by a method in which a polyarylene sulfide sample is heat-treated at a high temperature and quantified by using ion chromatography. In this case, the free iodine can be defined as referring collectively to an iodine molecule, an iodide ion, or an iodine radical that is generated in the process of polymerization of the diiodoaromatic compound and the elemental sulfur and remains together in a state of being chemically separated from the finally formed polyarylene sulfide.

In the preparation process of another embodiment, the diiodoaromatic compounds usable in the polymerization reaction include one or more compounds selected from the group consisting of diiodobenzene (DIB), diiodonaphthalene, diiodobiphenyl, diiodobisphenol and diiodobenzophenone, but not limited to or by them, and diiodoaromatic compounds in which alkyl group or sulfone group is bonded as a substituent to the above compounds or an oxygen or nitrogen atom is included in the aromatic group may also be used. Further, the diiodoaromatic compounds may include isomers of various diiodocompounds depending on the position at which the iodine atom is attached. Among them, a compound having iodine at para-position like para-diiodobenzene (pDIB), 2,6-diiodonaphthalene, or p,p'-diiodobiphenyl may be used more preferably.

And, there is no particular limitation on the form of elemental sulfur which reacts with the diiodoaromatic compound. Normally, elemental sulfur exists in a cyclooctasulur (S8) form in which 8 atoms are connected at room temperature. However, if not such form, any commercially available solid or liquid type sulfur may be used without particular limitation.

In addition, the reactants may further include a polymerization initiator, a stabilizer, or a mixture thereof. Specific examples of the polymerization initiator which can be used include one or more initiators selected from the group consisting of 1,3-diiodo-4-nitrobenzene, mercaptobenzothiazole, 2,2'-dithiobenzothiazole, cyclohexylbenzothiazole sulfenamide, and butylbenzothiazole sulfonamide, but are not limited to or by them.

And, the stabilizer is not particularly limited as long as it is a stabilizer usually used in the polymerization reaction of the resin.

Meanwhile, during the polymerization reaction as described above, a polymerization terminator may be added thereto at the time when the polymerization has been carried out to some extent. At this time, any polymerization terminator can be used without particular limitation as long as it can terminate the polymerization by eliminating iodine group included in the polymerized polymer. Specifically, one or more compounds selected from the group consisting of diphenyl disulfide, diphenyl ether, diphenyl, benzophenone, dibenzothiazole disulfide, monoiodoaryl compound, benzothiazoles, benzothiazolesulfenamides, thiurams, dithiocarbamates, and diphenyl disulfide may be used.

More preferably, as the polymerization terminator, one or more compounds selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide may be used.

Meanwhile, the time of adding the polymerization terminator may be determined in consideration of the molecular weight of the polyarylene sulfide to be finally polymerized. For example, the polymerization terminator may be added at a time when about 70 to 100 wt % of the diiodoaromatic compound contained in the initial reactant are reacted and exhausted.

And, the polymerization reaction may be carried out under any condition as long as it is a condition capable of initiating the polymerization of reactants including a diiodoaromatic compound and an elemental sulfur. For example, the polymerization reaction may be carried out in a temperature-rising and pressure-reducing reaction condition. In this case, the reaction may be carried out for about 1 to 30 hours while varying the temperature and pressure condition from the initial reaction condition of about 180 to 250° C. and about 50 to 450 torr to the final reaction condition of about 270 to 350° C. and about 0.001 to 20 torr. As a more specific example, the polymerization reaction may be carried out under the final reaction condition of about 280 to 300° C. and about 0.1 to 0.5 torr.

Meanwhile, the preparation method of the polyarylene sulfide according to another embodiment may further include the step of melt-mixing reactants including a diiodoaromatic compound and an elemental sulfur before the polymerization reaction. The condition of the melt-mixing is not limited as long as it is a condition capable of melt-mixing all of the above-mentioned reactants, and for example, the process may be carried out at the temperature of about 130° C. to 200° C., or about 160° C. to 190° C.

Like this, by carrying out the melt-mixing step before the polymerization reaction, subsequent polymerization reaction can be carried out more easily.

Furthermore, in the preparation method of polyarylene sulfide according to another embodiment, the polymerization reaction may be carried out in the presence of a nitrobenzene-based catalyst. And, when the melt-mixing step is carried out before the polymerization reaction as disclosed above, the catalyst may be added in the melt-mixing step. As the nitrobenzene-based catalyst, 1,3-diiodo-4-nitrobenzene, or 1-iodo-4-nitrobenzene may be used, but it is not limited to or by them.

Meanwhile, according to another embodiment of the invention, there is provided a molded article including the polyarylene sulfide of the above-mentioned one embodiment. The molded article may solely consist of the polyarylene sulfide or may further include other polymer materials and/or reinforcements/fillers. The polyarylene sulfide shows excellent compatibility with other polymer materials and/or reinforcements/fillers, and makes it possible to provide a resin composition or a molded article having superior physical properties by being mixed (for example, compounded) with them. At this time, the polymer materials and/or reinforcements/fillers which can be compounded with the polyarylene sulfide are same as disclosed above.

Such molded article may include about 10 to 99 wt. % or about 50 to 90 wt. % of the polyarylene sulfide and about 1 to 90 wt. % or about 10 to 50 wt. % of one or more components selected from the group consisting of a thermoplastic resin, a thermoplastic elastomer, and a filler. And, by molding the resin composition satisfying above content range with a method such as biaxial extrusion, the molded article having excellent properties and applicable to various uses can be obtained.

The molded article of still another embodiment may be in various form such as films, sheets, fibers, and the like. Further, the molded article may be an injection molded article, an extrusion molded article, or a blow molded article. In the injection molding process, the mold temperature may be about 50° C. or more, about 60° C. or more, or about 80° C. or more in the aspect of crystallization, and the temperature may be about 190° C. or less, about 170° C. or less, or about 160° C. or less in the aspect of deformation of specimen.

And, if the molded article is formed into a film or a sheet, it may be made into various films or sheets such as undrawn, uniaxially drawn, or biaxially drawn films or sheets. If it is a fiber, it may be made into various fibers such as a undrawn, a drawn, or an ultradrawn fiber, and it may be used as a fabric, a knitted fabric, a nonwoven fabric (spunbond, melt-blown, or staple), a rope, or a net.

Such molded articles may be used as electric & electronic parts such as computer parts, architectural elements, car parts, machine parts, daily necessities, coating parts to which chemical materials contact, industrial chemical resistant fiber, and the like.

In the present invention, further details besides the disclosure above may be added and subtracted as needed, and they are not limited particularly in the present invention.

Effects of the Invention

The present invention can provide a melt-polymerized polyarylene sulfide having excellent compatibility with other polymer materials or reinforcements/fillers because of hydroxy group included at the end of the main chain.

Such polyarylene sulfide can exhibit excellent properties optimized to various uses and excellent properties unique to the polyarylene sulfide by being compounded with other various polymer materials or fillers.

Therefore, such polyarylene sulfide can be applied to various uses including the use of compounding, and can exhibit excellent properties and effects.

DETAILED DESCRIPTION OF THE EMBODIMENT

Hereinafter, preferable examples are presented to aid in understanding of the present invention. However, the following examples are only for illustrating the present invention and the present invention is not limited to or by them.

Example 1: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 50 g of 2,2'-dithiobisbenzothiazole was added thereto as a polymerization terminator and the reaction was carried out for 1 hour. Subsequently, when the polymerization reaction was progressed 90%, 51 g of 4-iodophenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 1 was analyzed by FT-IR spectroscopy. At this time, the presence of the hydroxyl group peak was confirmed in the range of about 3300 to 3600 $cm^{-1}$ in the spectrum. It was also confirmed that the relative height intensity of the peak in the range of about 3300 to 3600 $cm^{-1}$ was about 0.4% when the height of the ring stretch peak shown in the range of about 1400 to 1600 $cm^{-1}$ was assumed as the intensity of 100%.

In addition, the content of iodine bonded to the main chain of the polyarylene and free iodine sulfide was measured by the method described below, and the content thereof was confirmed to be about 1500 ppmw.

Example 2: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 50 g of 2,2'-dithiobisbenzothiazole was added thereto as a polymerization terminator and the reaction was carried out for 1 hour. Subsequently, when the polymerization reaction was progressed 90%, 25 g of 4-iodophenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 2 was analyzed by FT-IR spectroscopy. At this time, the presence of the hydroxyl group peak was confirmed in the range of about 3300 to 3600 $cm^{-1}$ in the spectrum. It was also confirmed that the relative height intensity of the peak in the range of about 3300 to 3600 $cm^{-1}$ was about 0.24% when the height of the ring stretch peak shown in the range of about 1400 to 1600 $cm^{-1}$ was assumed as the intensity of 100%.

In addition, the content of iodine bonded to the main chain of the polyarylene and free iodine was measured by the method described below, and the content thereof was confirmed to be about 2000 ppmw.

Example 3: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 50 g of 2,2'-dithiobisbenzothiazole was added thereto as a polymerization terminator and the reaction was carried out for 1 hour. Subsequently, when the polymerization reaction was progressed 90%, 51 g of 4,4'-dithiodiphenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 3 was analyzed by FT-IR spectroscopy. At this time, the presence of the hydroxyl group peak was confirmed in the range of about 3300 to 3600 cm$^{-1}$ in the spectrum. It was also confirmed that the relative height intensity of the peak in the range of about 3300 to 3600 cm$^{-1}$ was about 0.62% when the height of the ring stretch peak shown in the range of about 1400 to 1600 cm$^{-1}$ was assumed as the intensity of 100%.

In addition, the content of iodine bonded to the main chain of the polyarylene and free iodine was measured by the method described below, and the content thereof was confirmed to be about 500 ppmw.

Example 4: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 50 g of 2,2'-dithiobisbenzothiazole was added thereto as a polymerization terminator and the reaction was carried out for 1 hour. Subsequently, when the polymerization reaction was progressed 90%, 25 g of 4,4'-dithiodiphenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 4 was analyzed by FT-IR spectroscopy. At this time, the presence of the hydroxyl group peak was confirmed in the range of about 3300 to 3600 cm$^{-1}$ in the spectrum. It was also confirmed that the relative height intensity of the peak in the range of about 3300 to 3600 cm$^{-1}$ was about 0.33% when the height of the ring stretch peak shown in the range of about 1400 to 1600 cm$^{-1}$ was assumed as the intensity of 100%.

In addition, the content of iodine bonded to the main chain of the polyarylene and free iodine was measured by the method described below, and the content thereof was confirmed to be about 1200 ppmw.

Example 5: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 30 g of diphenyl disulfide was added thereto as a polymerization terminator and the reaction was carried out for 1 hour. Subsequently, when the polymerization reaction was progressed 90%, 25 g of 4-iodophenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 5 was analyzed by FT-IR spectroscopy. At this time, the presence of the hydroxyl group peak was confirmed in the range of about 3300 to 3600 cm$^{-1}$ in the spectrum. It was also confirmed that the relative height intensity of the peak in the range of about 3300 to 3600 cm$^{-1}$ was about 0.27% when the height of the ring stretch peak shown in the range of about 1400 to 1600 cm$^{-1}$ was assumed as the intensity of 100%.

In addition, the content of iodine bonded to the main chain of the polyarylene and free iodine was measured by the method described below, and the content thereof was confirmed to be about 1800 ppmw.

Example 6: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 30 g of diphenyl disulfide was added thereto as a polymerization terminator and the reaction was carried out for 1 hour. Subsequently, when the reaction was progressed 90%, 51 g of 4,4'-dithiodiphenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 6 was analyzed by FT-IR spectroscopy. At this time, the presence of the hydroxyl group peak was confirmed in the range of about 3300 to 3600 cm$^{-1}$ in the spectrum. It was also confirmed that the relative height intensity of the peak in the range of about 3300 to 3600 cm$^{-1}$ was about 0.58% when the height of the ring stretch peak shown in the range of about 1400 to 1600 cm$^{-1}$ was assumed as the intensity of 100%.

In addition, the content of iodine bonded to the main chain of the polyarylene and free iodine was measured by the method described below, and the content thereof was confirmed to be about 600 ppmw.

Example 7: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 35 g of diphenyl disulfide was added thereto as a polymerization terminator and the reaction was carried out for 1 hour. Subsequently, when the polymerization reaction was progressed 90%, 25 g of 4-iodophenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 7 was analyzed by FT-IR spectroscopy. At this time, the presence of the hydroxyl group peak was confirmed in the range of about 3300 to 3600 cm$^{-1}$ in the spectrum. It was also confirmed that the relative height intensity of the peak in the range of about 3300 to 3600 cm$^{-1}$ was about 0.29% when the height of the ring stretch peak shown in the range of about 1400 to 1600 cm$^{-1}$ was assumed as the intensity of 100%.

In addition, the content of iodine bonded to the main chain of the polyarylene and free iodine was measured by the method described below, and the content thereof was confirmed to be about 800 ppmw.

Example 8: Synthesis of Polyarylene Sulfide Including Hydroxy Group at the End of the Main Chain The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 35 g of diphenyl disulfide was added thereto as a polymerization terminator and the reaction was carried out for 1 hour. Subsequently, when the reaction was progressed 90%, 13 g of 4,4-dithiodiphenol was added thereto and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Example 8 was analyzed by FT-IR spectroscopy. At this time, the presence of the hydroxyl group peak was confirmed in the range of about 3300 to 3600 cm$^{-1}$ in the spectrum. It was also confirmed that the relative height intensity of the peak in the range of about 3300 to 3600 cm$^{-1}$ was about 0.26% when the height of the ring stretch peak shown in the range of about 1400 to 1600 cm$^{-1}$ was assumed as the intensity of 100%.

In addition, the content of iodine bonded to the main chain of the polyarylene and free iodine was measured by the method described below, and the content thereof was confirmed to be about 700 ppmw.

Comparative Example 1

The reactants including 5,130 g of p-diiodobenzene (p-DIB) and 450 g of sulfur was completely melted and mixed in a 5 L reactor equipped with a thermocouple capable of measuring the inside temperature of the reactor and a vacuum line for nitrogen purging and vacuumizing by heating the same to 180° C., and then polymerization reaction was progressed by carrying out temperature-rising and pressure reducing step by step from the initial reaction condition of 220° C. and 350 torr to the final reaction temperature of 300° C. and the pressure of 1 torr or less, and then further adding sulfur little by little. When the polymerization reaction was progressed 80% (the degree of progress of the polymerization reaction was identified by the relative viscosity ratio according to the formula "(present viscosity/target viscosity)*100%", and the present viscosity was measured with a viscometer after taking a sample from the reactor where the polymerization reaction was progressing), 50 g of 2,2'-dithiobisbenzothiazole was added thereto as a polymerization terminator and reacted under nitrogen atmosphere for 10 minutes. The reaction was further progressed with slowly vacuumizing to 0.5 torr or less, and terminated when the viscosity reached the target viscosity. Thereby, the polyarylene sulfide resin having hydroxyl group at the end of the main chain was synthesized. The final resin obtained by the reaction was prepared into pellets by using a small strand cutter.

The polyarylene sulfide resin of Comparative Example 1 was analyzed by FT-IR spectroscopy. As a result, it was confirmed that there was no hydroxyl group peak in the range of about 3300 to 3600 cm$^{-1}$ in the spectrum.

In addition, the content of iodine bonded to the main chain of the polyarylene and free iodine was measured by the method described below, and the content thereof was confirmed to be about 2500 ppmw.

Comparative Example 2

Product name Z200 of DIC Co., Ltd. in which the polyarylene sulfide made by Macallum process was compounded with an elastomer was used as Comparative Example 2.

Experimental Example 1: Evaluation of Basic Properties of Polyarylene Sulfide

The physical properties of polyarylene sulfides of Examples 1 to 8 and Comparative Examples 1 to 2 were evaluated by the following methods:

Melting Point (Tm)

The melting point was measured by using a differential scanning calorimeter (DSC) by elevating the temperature from 30° C. to 320° C. with a speed of 10° C./min, then cooling the temperature to 30° C., and then again elevating the temperature from 30° C. to 320° C. with a speed of 10° C./min.

Number Average Molecular Weight (Mn) and Polydispersity Index (PDI)

The sample was dissolved in 1-chloronaphthalene with stirring at 250° C. for 25 minutes so as to be 0.4 wt % solution, and then the polyarylene sulfide having different molecular weights was sequentially separated in the column of a high-temperature gel permeation chromatography (GPC) system (210° C.) while flowing the solution with a flow rate of 1 mL/min. The intensity corresponding to the molecular weight of the separated polyarylene sulfide was measured by using a RI detector. After making a calibration line with a standard specimen (polystyrene) of which the molecular weight was known, the relative number average molecular weight (Mn) and polydispersity index (PDI) of the measured sample were calculated.

Melt Viscosity (Poise)

The melt viscosity (hereinafter, referred to as 'M.V.') was measured at 300° C. by using a rotating disk viscometer. In frequency sweep measuring method, angular frequency was measured from 0.6 to 500 rad/s, and the viscosity at 1.84 rad/s was defined as the melt viscosity (M.V.).

Content of Iodine Bonded to Main Chain and Free Iodine (Ppmw)

The content of iodine bonded to the main chain and free iodine (ppmw) was determined as follows. The sample was prepared through an automatic pretreatment system (AQF) in which the sample was combusted with a furnace at high temperature and then iodine was ionized and dissolved in distilled water. The content of iodine in the sample was measured by using a calibration curve previously analyzed for the sample via ion chromatography The physical properties measured according to above methods are listed in Table 1 below:

TABLE 1

| Classification | Melting point (° C.) | Number average molecular weight | Polydispersity Index (PDI) | Melt Viscosity (Poise) | Iodine content (ppmw) |
|---|---|---|---|---|---|
| Example 1 | 278.1 | 17,124 | 2.9 | 2,150 | 1500 |
| Example 2 | 278.8 | 17,333 | 2.8 | 2,210 | 2000 |
| Example 3 | 277.5 | 17,225 | 2.9 | 1,960 | 500 |
| Example 4 | 277.8 | 17,457 | 2.8 | 2,010 | 1200 |
| Example 5 | 279.2 | 17,320 | 2.9 | 2,530 | 1800 |
| Example 6 | 278.3 | 17,112 | 2.9 | 2,440 | 600 |
| Example 7 | 279.5 | 17,450 | 2.8 | 2,250 | 800 |
| Example 8 | 279.2 | 17,420 | 2.8 | 2,150 | 700 |
| Comparative Example 1 | 280.5 | 17,267 | 2.8 | 2,420 | 2500 |
| Comparative Example 2 | 282.0 | 15,237 | 3.1 | 2,000 | 0 |

Experimental Example 2: Evaluation of Mechanical Properties of Polyarylene Sulfide The mechanical properties of the polyarylene sulfides of Examples 1 to 8 and Comparative Example 1 were evaluated by the following methods. When measuring each of these physical properties, the specimen was obtained under the following conditions:

Production Conditions of Test Specimen

The test specimen was prepared from 3 kg of polyarylene sulfide) with an injection mold machine (Engel ES75P, mold clamping force of 80 tons, diameter of 25 mm) and the test was carried out according to ASTM D638. In the process, the barrel temperature was set to 270° C./300° C./300° C. in order from the feeding inlet, and the nozzle temperature was 300° C., and the mold temperature was 150° C.

Tensile Strength and Elongation

The tensile strength and the elongation of the polyarylene sulfide specimens prepared according to Examples 1 to 8 and Comparative Example 1 were measured according to ASTM D 638 method.

Flexural Strength and Flexural Strength Retention Ratio

The flexural strengths of the polyarylene sulfide specimens prepared according to Examples 1 to 8 and Comparative Example 1 were measured according to ASTM D 790. Then, after aging the specimen in an oven at 280° C. for 100 hours, the flexural strength was again measured and the flexural strength retention ratio was calculated based on the following formula:

The flexural strength retention ratio (%)=[(flexural strength after aging)/(flexural strength before aging)]*100

Impact Strength (Izod)

The impact strengths of the polyarylene sulfide specimens prepared according to Examples 1 to 8 and Comparative Example 1 were measured according to ASTM D 256.

The mechanical properties measured according to above methods are listed in Table 2 below:

TABLE 2

| Classification | Tensile strength (kgf/cm$^2$) | Elongation (%) | Flexural strength (kgf/cm$^2$) | Impact strength (J/m, Notched) |
|---|---|---|---|---|
| Example 1 | 617 | 1.5 | 1,420 | 18 |
| Example 2 | 608 | 1.4 | 1,415 | 17 |
| Example 3 | 605 | 1.2 | 1,432 | 18 |
| Example 4 | 650 | 1.3 | 1,425 | 17 |
| Example 5 | 602 | 1.4 | 1,433 | 19 |
| Example 6 | 605 | 1.6 | 1,454 | 17 |
| Example 7 | 603 | 1.4 | 1,428 | 21 |
| Example 8 | 615 | 1.3 | 1,477 | 18 |
| Comparative Example 1 | 622 | 1.2 | 1,453 | 19 |

The specimens were prepared by compounding the polyarylene sulfides of Examples 1 to 8 and Comparative Example 1 with other components according to the following methods:

Compounding of Polyarylene Sulfide and Glass Fiber

After drying the polymerized resin, the compounding was carried out with a small twin-screw extruder under the condition of the extrusion die temperature of 330° C. and the screw speed of 200 rpm while adding 40 parts by weight of Glass Fiber 910 (made by Owens Corning Co., Ltd.) to 60 parts by weight of the resin.

Compounding of Polyarylene Sulfide and Elastomer

The mixing extrusion was carried out under the condition of the extrusion die temperature of 300° C. and the screw speed of 200 rpm while adding 10 parts by weight of Lotader (Grade AX-8840, made by Arkema), the elastomer, to 90 parts by weight of the resin.

The mechanical properties of the compounded specimens prepared as above and the specimen of Comparative Example 2 were evaluated in the same manner as in the polyarylene sulfide specimen and are listed in Table 3 below.

TABLE 3

| Classification | Tensile Strength (kgf/cm$^2$) | Elongation (%) | Flexural Strength (kgf/cm$^2$) | Flexural strength retention ratio (%) | Impact strength (J/m, Notched) |
|---|---|---|---|---|---|
| Example 1 + Glass fiber 40% | 1,780 | 1.9 | 2,420 | 87 | 92 |
| Example 2 + Glass fiber 40% | 1,760 | 1.8 | 2,415 | 85 | 90 |
| Example 3 + Glass fiber 40% | 1,770 | 1.9 | 2,410 | 86 | 89 |
| Example 4 + Glass fiber 40% | 1,750 | 1.8 | 2,410 | 85 | 87 |
| Example 5 + Glass fiber 40% | 1,720 | 1.8 | 2,610 | 84 | 90 |
| Example 6 + Glass fiber 40% | 1,700 | 1.7 | 2,530 | 83 | 88 |
| Example 7 + Glass fiber 40% | 1,750 | 1.8 | 2,440 | 85 | 85 |
| Example 8 + Glass fiber 40% | 1,730 | 1.9 | 2,515 | 83 | 87 |
| Comparative Example 1 + Glass fiber 40% | 1,700 | 1.7 | 2,300 | 78 | 77 |
| Comparative Example 2 + Glass fiber 40% | 1,800 | 2.2 | 2,450 | 82 | 110 |
| Example 1 + Elastomer 10% | 590 | 18.0 | 1,050 | — | 55 |
| Example 2 + Elastomer 10% | 585 | 16.7 | 1,030 | — | 53 |
| Example 3 + Elastomer 10% | 588 | 17.5 | 1,030 | — | 51 |
| Example 4 + Elastomer 10% | 585 | 17.0 | 1,020 | — | 50 |
| Example 5 + Elastomer 10% | 575 | 17.5 | 1,030 | — | 48 |
| Example 6 + Elastomer 10% | 580 | 17.2 | 1,010 | — | 52 |

TABLE 3-continued

| Classification | Tensile Strength (kgf/cm$^2$) | Elongation (%) | Flexural Strength (kgf/cm$^2$) | Flexural strength retention ratio (%) | Impact strength (J/m, Notched) |
|---|---|---|---|---|---|
| Example 7 + Elastomer 10% | 586 | 17.8 | 1,035 | — | 48 |
| Example 8 + Elastomer 10% | 577 | 16.5 | 1,020 | — | 49 |
| Comparative Example 1 + Elastomer 10% | 556 | 2.5 | 950 | — | 17 |
| Comparative Example 2 | 660 | 15.7 | 940 | — | 76 |

According to Tables 2 and 3 above, it was confirmed that, by compounding the polyarylene sulfide of Example 1 of which hydroxy group is introduce to the end of the main chain with glass fiber, the impact strength was greatly elevated from about 18 J/m to about 92 J/m. Also, it was confirmed that, by compounding the polyarylene sulfide of Example 2 of which hydroxy group is introduced to the end group of the main chain with elastomer, the tensile elongation was greatly elevated from about 1.5% to about 18.0% and the izod strength from about 18 J/m to about 55 J/m. It was confirmed that the improvement in physical properties due to such compounding was equivalent even in other examples.

From the improvement of the physical properties due to such compounding, it was confirmed that the polyarylene sulfides of Examples can exhibit excellent compatibility with other various polymer materials or fillers, and consequently can exhibit excellent synergistic effects.

In contrast, it was confirmed that the polyarylene sulfide of Comparative Example 1 was inferior in the compatibility with other polymer materials or fillers and the synergistic effects caused by compounding was not so big.

What is claimed is:

1. A polyarylene sulfide in which at least part of end groups of a main chain of the polyarylene sulfide are hydroxyl groups (—OH),
    wherein the polyarylene sulfide contains iodine bonded to the main chain and free iodine, and a content of iodine bonded to the main chain and free iodine is 10 to 10,000 ppmw, and
    wherein the polyarylene sulfide shows a peak in the range of 3300 to 3600 cm$^{-1}$, in a FT-IR spectrum, and a relative height intensity of the peak in the range of 3300 to 3600 cm$^{-1}$ is 0.01 to 3%, when a height of a ring stretch peak shown in the range of 1400 to 1600 cm$^{-1}$ is assumed as an intensity of 100%, in the FT-IR spectrum.

2. The polyarylene sulfide according to claim 1, wherein the content of iodine bonded to the main chain and free iodine is 10 to 3000 ppmw.

3. The polyarylene sulfide according to claim 1, wherein a melting temperature is 265 to 290° C.

4. The polyarylene sulfide according to claim 1, wherein a number average molecular weight is 5,000 to 50,000.

5. The polyarylene sulfide according to claim 1, wherein a melt viscosity, measured with a rotating disk viscometer at 300° C., is 10 to 50,000 poise.

6. The polyarylene sulfide according to claim 1, wherein a tensile strength, measured according to ASTM D 638, is 100 to 900 kgf/cm$^2$.

7. The polyarylene sulfide according to claim 1, wherein an elongation, measured according to ASTM D 638, is 1 to 10%.

8. The polyarylene sulfide according to claim 1, wherein a flexural strength, measured according to ASTM D 790, is 100 to 2,000 kgf/cm$^2$.

9. The polyarylene sulfide according to claim 1, wherein an impact strength, measured according to ASTM D 256, is 1 to 100 J/m.

10. A molded article, including the polyarylene sulfide according to claim 1.

11. The molded article according to claim 10, which is in the form of film, sheet, or fiber.

* * * * *